(No Model.)

J. BURKHOLDER.
TRACTION WHEEL.

No. 317,719. Patented May 12, 1885.

WITNESSES
Edward Wolff.
George Cook.

INVENTOR
John Burkholder
By his Attorney
Rowland Cox.

UNITED STATES PATENT OFFICE.

JOHN BURKHOLDER, OF ASHLAND, OHIO.

TRACTION-WHEEL.

SPECIFICATION forming part of Letters Patent No. 317,719, dated May 12, 1885.

Application filed February 20, 1885. (No model.)

*To all whom it may concern:*

Be it known that I, JOHN BURKHOLDER, a citizen of the United States, and a resident of Ashland, in the county of Ashland and State of Ohio, have invented certain new and useful Improvements in Traction-Engine Wheels, of which the following is a specification.

The invention relates to an improvement in traction-engine wheels; and it consists in a novel arrangement of the teeth upon the periphery of the wheel, whereby the wheel will effectually bind and travel over the soil.

The particular arrangement of the teeth upon the wheel sought to be protected hereby is illustrated in the accompanying drawings, in which—

Figure 1:
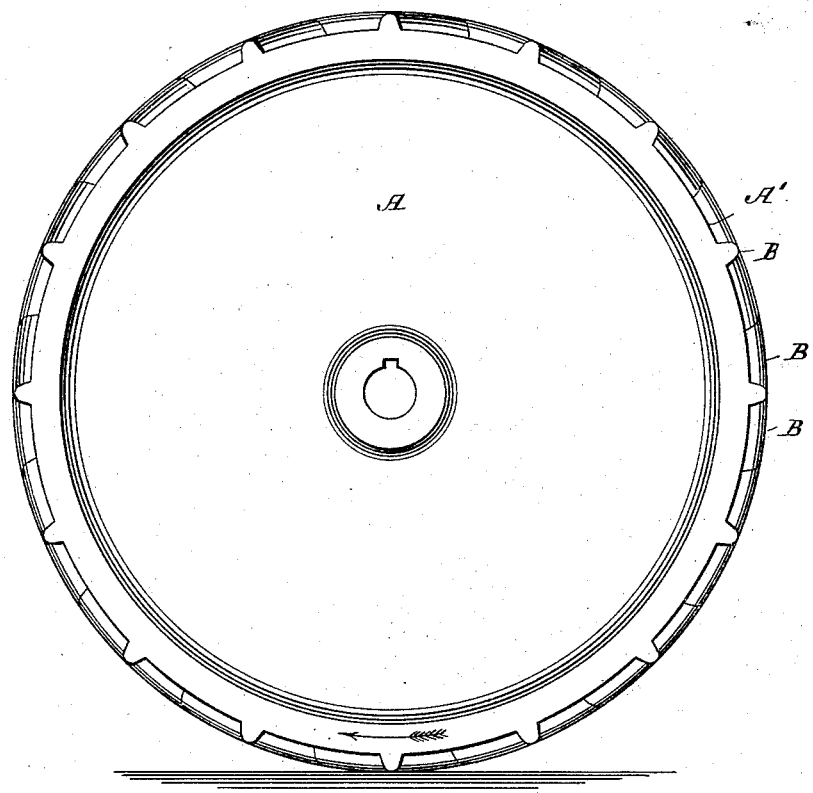
Figure 2:
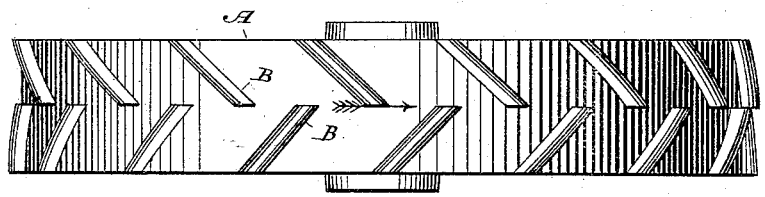

Figure 1 is a side elevation, and Fig. 2 is a plan view thereof.

A denotes the wheel, A' the rim, and B the teeth arranged thereon. It will be noted that two series of teeth, B, are employed, each of which inclines from the edges of the wheel inward toward the center of the circumference thereof, the teeth forming one series being arranged alternately with the teeth of which the other series is composed, the ends of the teeth of both series lying in the same vertical plane, as shown in the accompanying drawings.

I am aware that teeth have been used heretofore on traction-engine wheels having a concave rim; but this construction has been found objectionable, in that when the wheel is traveling in soft ground the rim will be clogged with soil, thereby practically converting it into a smooth rim; but such teeth have not, as far as I am aware, been arranged in alternate series, as hereinbefore described, upon a wheel having a smooth rim.

What I claim as my invention and desire to secure by Letters Patent, is—

A traction-engine wheel, A, having a smooth rim, A', provided with teeth B B, arranged in two series, the teeth forming one series being arranged alternately with the teeth of which the other is composed, the inner ends of the teeth of both series lying in the same vertical plane, substantially as set forth.

Signed at Ashland, in the county of Ashland and State of Ohio, this 22d day of November, A. D. 1884.

JOHN BURKHOLDER.

Witnesses:
THOS. E. BARROWS,
J. P. HENRY.